United States Patent
Aklin et al.

3,743,386
July 3, 1973

[54] ACHROMATIC CONDENSER FOR MICROSCOPE

[75] Inventors: George H. Aklin, Fairport; Richard L. Seidenberg, Rochester, both of N.Y.

[73] Assignee: Bausch & Lomb Incorporated, Rochester, N.Y.

[22] Filed: Feb. 11, 1972

[21] Appl. No.: 225,492

[52] U.S. Cl............ 350/214, 350/87, 350/175 ML, 350/223
[51] Int. Cl. ............................................ G02b 21/08
[58] Field of Search................ 350/87, 214, 175 ML

[56] References Cited
UNITED STATES PATENTS
3,137,761  6/1964  Conradi et al. .................. 350/87
3,421,808  1/1969  Gottlieb ........................... 350/87

*Primary Examiner*—John K. Corbin
*Attorney*—Frank C. Parker et al.

[57] ABSTRACT

A microscope condenser lens design has eight components and eleven elements in three groups. It is achromatized and has an unusually high numerical aperture.

6 Claims, 1 Drawing Figure

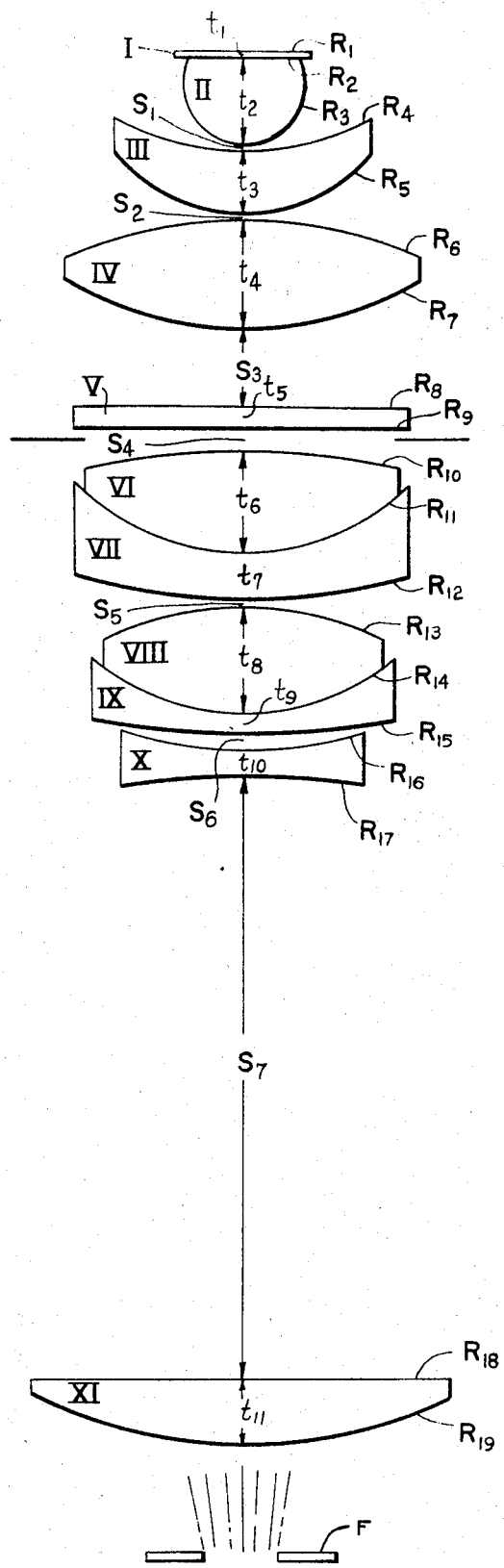

3,743,386

ACHROMATIC CONDENSER FOR MICROSCOPE

BACKGROUND OF THE INVENTION

1. Field of the Invention

This invention lies in the field of lens designs and more specifically in the field of multiple component lenses.

2. Description of the Prior Art

Two part optical condensers of relatively high numerical aperture are known, however such condensers tend to suffer from relatively large spherical and chromatic aberrations. The instant design produces a lens system which, at its full numerical aperture provides an exceptionally high degree of correction of these aberrations for improved resolution and contrast.

SUMMARY OF THE INVENTION

The lenses here disclosed are preferably used in a microscope condenser having substantially two parts, an upper pivotable unit and a lower portion. As is well known in the art it is the function of a microscope condenser to form a sharp image of an illuminated field diaphragm in the specimen plane of the microscope objective. In condensers of the kind in which the disclosed lenses are to be used, the entire lens system has a high numerical aperture, and when the upper portion is pivoted out of the otpical path, the remaining lower portion can be used at lower numerical apertures to focus a sharp image of the field diaphragm in the specimen plane.

The system includes, as part of the lower portion, a light gathering lens, fixed in position near a field diaphragm or other light filled aperture, and which is used interchangeably with any of several condensers which may be substituted for the one here disclosed. The system as a whole is focusable, the lenses above the aforementioned fixed lens being movable as a unit to provide a sharp image of the field diaphragm in the specimen plane. When the upper group is pivoted out of the optical path, the lower portion is refocussed to provide a sharp image. A standard microscope slide and oil immersing medium is assumed for purposes of the design calculations to be in the optical path.

The pivotable group comprises a thin plano parallel plate in surface contact with a plano face of a hemispheroidal lens on the side of the specimen plane. A positive meniscus lens, concave toward the subject, lies either in center contact with the hemispheroidal lens or airspaced very slightly from it. The pivotable group is completed by a biconvex lens narrowly airspaced from the positive meniscus.

The lower group comprises a plano parallel plate airspaced from a tandem pair of doublets having positive components toward the stage and airspaced from one another, as well as from the plano parallel plate, and from a biconcave singlet on the light source side.

The upper, pivoting group is widely airspaced from the plano parallel plate of the lower group to permit mechanical clearance of the upper group therefrom when pivoting in and out of position.

Verifications based upon comparison of $\Delta H$, $\tan U$ curves for the instant design against those of prior art lenses, i.e., curves of the deviation $\Delta H$ of the points at which rays intersect the focal plane, with the tangents of the angle $U$ made by each such ray with the optical axis, indicate that the instant design is significantly better corrected for spherical and chromatic aberration over the same field than were the prior art lenses.

BRIEF DESCRIPTION OF THE DRAWING

The FIGURE is an optical schematic diagram of the lens.

DESCRIPTION OF THE PREFERRED EMBODIMENTS

The general shape characteristics of the condenser lens designs are shown in FIG. 1 where the element I is a thin plano parallel plate of relatively high refractive index and high dispersion or low $\nu$ number. It lies in surface contact with the plano face of lens II which is a hemispheroidal lens of relatively low refractive index and relatively low dispersion or high $\nu$ number. Lens III is very narrowly airspaced from lens II, and in fact its separation may be so small as to vanish in which case it lies in center contact therewith. Lens III is a positive meniscus lens curved toward the specimen plane and having a low index and a low dispersion. Lens IV is a biconvex lens of relatively low refractive index and low dispersion somewhat narrowly airspaced from lens III. Lenses I–IV constitute a movable group pivotable into and out of the optical axis of the microscope.

Element V is a plano parallel plate and may be chosen to serve as a dust cover, phase contrast reticle, monochromatic filter, or for a variety of other purposes. Its optical characteristics are taken into account in calculating the construction parameters of the disclosed lenses, however its index and dispersion may be varied if optimizing adjustments are made in the remainder of the general lens sytem in ways well understood by those skilled in the arts of optical design, without doing undue violence to the overall performance. Since lens V is the first lens in the lower portion, it is widely airspaced from lens IV so as to permit the pivotal lens group adequate mechanical freedom to be swung into and out of position. Lenses VI and VII constitute a doublet which is airspaced from the element V. Lens VI is a biconvex lens of relatively low index and low dispersion while lens VII is a negative meniscus of quite high index and high dispersion lying in surface contact with lens VI.

Lenses VIII and IX likewise form a doublet of the same general shape characteristics as lenses VI and VII. Lens VIII is a biconvex lens of relatively low index and low dispersion while lens IX is again a negative meniscus of relatively high index and high dispersion and lying in surface contact with lens VIII. Lens X is a biconcave negative lens of relatively high index and high dispersion which is narrowly airspaced from the lens IX.

A plano convex lens XI of moderate index and relatively low dispersion is in fixed position beneath the lenses I-X, those lenses being axially movable over a substantial range for focussing to accommodate microscope slides of varying thicknesses. When the upper group is pivoted out of the optical path the lower portion may be refocussed to provide a sharp image.

The construction data in the tables below is given in radii R, thicknesses t and spaces S ratioed to the focal length f of the entire condenser lens, negative radii being centered on the subject or specimen side, each characteristic being subnumerated from the subject side toward the field diaphragm F. The refractive indices, $n_D$ are the indices respectively of each element, subnumerated progressively from the subject toward the field diaphragm F and are given as measured on the Fraunhofer D line for yellow sodium light. The $\nu$ numbers are additionally subnumerated in progressive order from the subject toward the field diaphragm F and are the familiar dispersion values or Abbe numbers of the glasses used in each element.

TABLE I

| | |
|---|---|
| $R_1$ | ∞ |
| $R_2$ | ∞ |
| $-R_3$ | 0.038f |
| $-R_4$ | 0.161f |
| $-R_5$ | 0.097f |
| $R_6$ | 0.263f |
| $-R_7$ | 0.203f |
| $R_8$ | ∞ |
| $R_9$ | ∞ |
| $R_{10}$ | 0.380f |
| $-R_{11}$ | 0.135f |
| $-R_{12}$ | 0.432f |
| $R_{13}$ | 0.178f |
| $-R_{14}$ | 0.144f |
| $-R_{15}$ | 1.212f |
| $-R_{16}$ | 0.258f |
| $R_{17}$ | 0.816f |
| $R_{18}$ | ∞ |
| $-R_{19}$ | 0.280f |
| $t_1$ | 0.003f |
| $t_2$ | 0.051f |
| $t_3$ | 0.035f |
| $t_4$ | 0.062f |
| $t_5$ | 0.013f |
| $t_6$ | 0.059f |
| $t_7$ | 0.029f |
| $t_8$ | 0.060f |
| $t_9$ | 0.013f |
| $t_{10}$ | 0.016f |
| $t_{11}$ | 0.035f |
| $S_1$ | 0 |
| $S_2$ | 0.001f |
| $S_3$ | 0.045f |
| $S_4$ | 0.011f |
| $S_5$ | 0.002f |
| $S_6$ | 0.010f |
| $S_7$ | 0.339f (nominal) |
| $n_{D1}$ | 1.720 |
| $n_{D2}$ | 1.517 |
| $n_{D3}$ | 1.517 |
| $n_{D4}$ | 1.523 |
| $n_{D5}$ | 1.522 |
| $n_{D6}$ | 1.517 |
| $n_{D7}$ | 1.751 |
| $n_{D8}$ | 1.517 |
| $n_{D9}$ | 1.720 |
| $n_{D10}$ | 1.720 |
| $n_{D11}$ | 1.541 |
| $\nu_1$ | 29.3 |
| $\nu_2$ | 64.5 |
| $\nu_3$ | 64.5 |
| $\nu_4$ | 58.6 |
| $\nu_5$ | 58.6 |
| $\nu_6$ | 64.5 |
| $\nu_7$ | 27.8 |
| $\nu_8$ | 64.5 |
| $\nu_9$ | 29.3 |
| $\nu_{10}$ | 29.3 |
| $\nu_{11}$ | 59.9 |

TABLE II

| | |
|---|---|
| $R_1$ | ∞ |
| $R_2$ | ∞ |
| $-R_3$ | 0.037f |
| $-R_4$ | 0.161f |
| $-R_5$ | 0.097f |
| $R_6$ | 0.263f |
| $-R_7$ | 0.203f |
| $R_8$ | ∞ |
| $R_9$ | ∞ |
| $R_{10}$ | 0.346f |
| $-R_{11}$ | 0.143f |
| $-R_{12}$ | 0.496f |
| $R_{13}$ | 0.170f |
| $-R_{14}$ | 0.161f |
| $-R_{15}$ | 2.397f |
| $-R_{16}$ | 0.260f |
| $R_{17}$ | 0.895f |
| $R_{18}$ | ∞ |
| $-R_{19}$ | 0.280f |
| $t_1$ | 0.003f |
| $t_2$ | 0.051f |
| $t_3$ | 0.035f |
| $t_4$ | 0.062f |
| $t_5$ | 0.013f |
| $t_6$ | 0.051f |
| $t_7$ | 0.019f |
| $t_8$ | 0.051f |
| $t_9$ | 0.013f |
| $t_{10}$ | 0.013f |
| $t_{11}$ | 0.035f |
| $S_1$ | 0.001f |
| $S_2$ | 0.001f |
| $S_3$ | 0.045f |
| $S_4$ | 0.011f |
| $S_5$ | 0.001f |
| $S_6$ | 0.010f |
| $S_7$ | 0.339f (nominal) |
| $n_{D1}$ | 1.720 |
| $n_{D2}$ | 1.517 |
| $n_{D3}$ | 1.517 |
| $n_{D4}$ | 1.523 |
| $n_{D5}$ | 1.522 |
| $n_{D6}$ | 1.517 |
| $n_{D7}$ | 1.751 |
| $n_{D8}$ | 1.517 |
| $n_{D9}$ | 1.720 |
| $n_{D10}$ | 1.720 |
| $n_{D11}$ | 1.541 |
| $\nu_1$ | 29.3 |
| $\nu_2$ | 64.5 |
| $\nu_3$ | 64.5 |
| $\nu_4$ | 58.6 |
| $\nu_5$ | 58.6 |
| $\nu_6$ | 64.5 |
| $\nu_7$ | 27.8 |
| $\nu_8$ | 64.5 |
| $\nu_9$ | 29.3 |
| $\nu_{10}$ | 29.3 |
| $\nu_{11}$ | 59.9 |

The construction data listed are subject to certain variations, as is well known to those skilled in the lens designing art, without rendering the lens system valueless for use as a microscope condenser. Especially, it is thought that variations in the radii of curvature to the extent of at least one unit in the third decimal place, or in the case of nominally plano surfaces, to plus or minus ten times the focal length of the complete system, may be permissible if it is understood that some degradation of performance may be thereby incurred. Subject to the same conditions, variations of refractive index to two units in the third decimal place and in the dispersions by one unit, are thought to be permissible.

The thicknesses and spaces are likewise tolerant of certain small variations which are as follows: Where $f$ is the system focal length, $t_1$ may vary between $0.002f$ and $0.005f$; $t_2$ between $0.050f$ and $0.053f$; $t_3$ between $0.033f$ and $0.037f$; $t_4$ between $0.060f$ and $0.063f$; $t_5$ between $0.009f$ and $0.016f$; $t_6$ between $0.051f$ and $0.061f$; $t_7$ between $0.019f$ and $0.031f$; $t_8$ between $0.051f$ and $0.063f$; $t_9$ between $0.011f$ and $0.015f$; $t_{10}$ between $0.013f$ and $0.018f$; $t_{11}$ between $0.032f$ and $0.038f$; $S_1$ between 0 and $0.001f$; $S_2$ between $0.0002f$ and $0.003f$; $S_3$ between $0.043f$ and $0.050f$; $S_4$ between $0.010f$ and $0.012f$; $S_5$ between $0.001f$ and $0.003f$; $S_6$ between $0.009f$ and $0.011f$; and $S_7$ focusses between $0.330f$ and $0.370f$.

Again with reference to FIG. 1 it is thought that those skilled in the lens design art and having access to the computing tools normally applied in the practice of the art, would, without undue effort, be able to design, by postulating, and verifying the suitability of, lenses for the purposes herein suggested, from the generalized order and shapes of the lenses disclosed in FIG. 1 and verbally described above, and from the relationships of the effective focal lengths of the various individual and doublet elements. These focal lengths are listed in the table below as a ratio of the focal length f of the complete lens system, negative numbers referring to negative focal lengths.

| Lens | Focal length |
|---|---|
| I | ∞ |
| II | 0.073f |
| III | 0.399f |
| IV | 0.299f |
| V | ∞ |
| VI | 0.201f |
| VII | −0.274f |
| VIII | 0.165f |
| IX | −0.229f |
| X | −0.279f |
| XI | 0.522f |
| I–II | 0.073f |
| VI–VII | 0.725f |
| VIII–IX | 0.461f |

We claim:

1. A lens having a focal length $f$ and comprising a plurality of optical elements described by successive subnumerated radii R taken as positive when centered on one side of said lens and negative when centered on the other side and ratioed to $f$, by successive subnumerated thicknesses $t$ and spatial separations S both ratioed to $f$, and by successive subnumerated glass characteristics, refractive indices $n_D$ and dispersions $v$, said plurality of optical elements comprising in increasing consecutive numerical order:

a substantially plano parallel plate I of radii $R_1$ and $R_2$ and thickness $t_1$;

a plano-hemispheroidal lens II of radii $R_2$ and $−R_3$ and thickness $t_2$ in surface contact with said plate I;

a positive meniscus lens III of radii $−R_4$ and $−R_5$ very narrowly spaced by a space $S_1$, from said lens II;

a biconvex lens IV of radii $R_6$ and $−R_7$ and thickness $t_4$ airspaced from said lens III by a space $S_2$;

a substantially plano parallel plate V having radii $R_8$ and $R_9$ and thickness $t_5$ airspaced from said lens IV by a space $S_3$;

a biconvex lens VI of radii $R_{10}$ and $−R_{11}$ and thickness $t_6$ airspaced from said plate V by a space $S_4$;

a negative meniscus lens VII of radii $−R_{11}$ and $−R_{12}$ and thickness $t_7$ in surface contact with said lens VI;

a biconvex lens VIII of radii $R_{13}$ and $−R_{14}$ and thickness $t_8$ airspaced from said lens VII by a space $S_5$;

a negative meniscus lens IX of radii $−R_{14}$ and $−R_{15}$ and thickness $t_9$ in surface contact with said lens VIII;

a biconcave lens X of radii $−R_{16}$ and $R_{17}$ and thickness $t_{10}$ airspaced from said lens IX by a space $S_6$; and a lens XI widely airspaced by a space $S_7$ from said lens X said lens XI being defined by a substantially plano radius $R_{18}$ facing said lens X, a radius $−R_{19}$, and a thickness $t_{11}$:

wherein:

| | | | | |
|---|---|---|---|---|
| 10f | < | $R_1$ | < | −10f |
| 10f | < | $R_2$ | < | −10f |
| 0.036f | < | $−R_3$ | < | 0.039f |
| 0.160f | < | $−R_4$ | < | 0.162f |
| 0.096f | < | $−R_5$ | < | 0.098f |
| 0.262f | < | $R_6$ | < | 0.264f |
| 0.202f | < | $−R_7$ | < | 0.204f |
| 10f | < | $R_8$ | < | −10f |
| 10f | < | $R_9$ | < | −10f |
| 0.345f | < | $R_{10}$ | < | 0.381f |
| 0.134f | < | $−R_{11}$ | < | 0.144f |
| 0.431f | < | $−R_{12}$ | < | 0.497f |
| 0.169f | < | $R_{13}$ | < | 0.179f |
| 0.143f | < | $−R_{14}$ | < | 0.162f |
| 1.211f | < | $−R_{15}$ | < | 2.398f |
| 0.257f | < | $−R_{16}$ | < | 0.261f |
| 0.815f | < | $R_{17}$ | < | 0.896f |
| 10f | < | $R_{18}$ | < | −10f |
| 0.279f | < | $−R_{19}$ | < | 0.281f |
| 0.002f | < | $t_1$ | < | 0.005f |
| 0.050f | < | $t_2$ | < | 0.053f |
| 0.033f | < | $t_3$ | < | 0.037f |
| 0.060f | < | $t_4$ | < | 0.063f |
| 0.009f | < | $t_5$ | < | 0.016f |
| 0.051f | < | $t_6$ | < | 0.061f |
| 0.019f | < | $t_7$ | < | 0.031f |
| 0.051f | < | $t_8$ | < | 0.063f |
| 0.011f | < | $t_9$ | < | 0.015f |
| 0.013f | < | $t_{10}$ | < | 0.018f |
| 0.032f | < | $t_{11}$ | < | 0.038f |
| 0 | < | $S_1$ | < | 0.001f |
| 0.0002f | < | $S_2$ | < | 0.003f |
| 0.043f | < | $S_3$ | < | 0.050f |
| 0.010f | < | $S_4$ | < | 0.012f |
| 0.001f | < | $S_5$ | < | 0.003f |
| 0.009f | < | $S_6$ | < | 0.011f |
| 0.330f | < | $S_7$ (focusable) | < | 0.370f |
| 1.718 | < | $n_{D1}$ | < | 1.722 |
| 1.515 | < | $n_{D2}$ | < | 1.519 |
| 1.515 | < | $n_{D3}$ | < | 1.519 |
| 1.521 | < | $n_{D4}$ | < | 1.525 |
| 1.520 | < | $n_{D5}$ | < | 1.524 |
| 1.515 | < | $n_{D6}$ | < | 1.519 |
| 1.749 | < | $n_{D7}$ | < | 1.753 |
| 1.515 | < | $n_{D8}$ | < | 1.519 |
| 1.718 | < | $n_{D9}$ | < | 1.722 |
| 1.718 | < | $n_{D10}$ | < | 1.722 |
| 1.539 | < | $n_{D11}$ | < | 1.543 |
| 28.3 | < | $v_1$ | < | 30.3 |
| 63.5 | < | $v_2$ | < | 65.5 |
| 63.5 | < | $v_3$ | < | 65.5 |
| 57.6 | < | $v_4$ | < | 59.6 |
| 57.6 | < | $v_5$ | < | 59.6 |
| 63.5 | < | $v_6$ | < | 65.5 |
| 26.8 | < | $v_7$ | < | 28.8 |
| 63.5 | < | $v_8$ | < | 65.5 |
| 28.3 | < | $v_9$ | < | 30.3 |
| 28.3 | < | $v_{10}$ | < | 30.3 |
| 58.9 | < | $v_{11}$ | < | 60.9 |

2. The lens of claim 1 wherein said values are as listed in the table below:

| | |
|---|---|
| $R_1$ | ∞ |
| $R_2$ | ∞ |
| $−R_3$ | 0.038f |
| $−R_4$ | 0.161f |
| $−R_5$ | 0.097f |
| $R_6$ | 0.263f |
| $−R_7$ | 0.203f |
| $R_8$ | ∞ |
| $R_9$ | ∞ |
| $R_{10}$ | 0.380f |
| $−R_{11}$ | 0.135f |
| $−R_{12}$ | 0.432f |
| $R_{13}$ | 0.178f |
| $−R_{14}$ | 0.144f |
| $−R_{15}$ | 1.212f |
| $−R_{16}$ | 0.258f |
| $R_{17}$ | 0.816f |
| $R_{18}$ | ∞ |
| $−R_{19}$ | 0.280f |
| $t_1$ | 0.003f |
| $t_2$ | 0.051f |
| $t_3$ | 0.035f |
| $t_4$ | 0.062f |
| $t_5$ | 0.013f |
| $t_6$ | 0.059f |
| $t_7$ | 0.029f |
| $t_8$ | 0.060f |
| $t_9$ | 0.013f |
| $t_{10}$ | 0.016f |
| $t_{11}$ | 0.035f |
| $S_1$ | 0 |
| $S_2$ | 0.001f |
| $S_3$ | 0.045f |
| $S_4$ | 0.011f |
| $S_5$ | 0.002f |
| $S_6$ | 0.010f |
| $S_7$ | 0.339f (nominal) |
| $n_{D1}$ | 1.720 |
| $n_{D2}$ | 1.517 |
| $n_{D3}$ | 1.517 |
| $n_{D4}$ | 1.523 |
| $n_{D5}$ | 1.522 |
| $n_{D6}$ | 1.517 |
| $n_{D7}$ | 1.751 |
| $n_{D8}$ | 1.517 |
| $n_{D9}$ | 1.720 |
| $n_{D10}$ | 1.720 |
| $n_{D11}$ | 1.541 |
| $v_1$ | 29.3 |
| $v_2$ | 64.5 |

| | |
|---|---|
| $\nu_3$ | 64.5 |
| $\nu_4$ | 58.6 |
| $\nu_5$ | 58.6 |
| $\nu_6$ | 64.5 |
| $\nu_7$ | 27.8 |
| $\nu_8$ | 64.5 |
| $\nu_9$ | 29.3 |
| $\nu_{10}$ | 29.3 |
| $\nu_{11}$ | 59.9 |

3. The lens of claim 1 wherein said values are as listed in the table below:

| | |
|---|---|
| $R_1$ | ∞ |
| $R_2$ | ∞ |
| $-R_3$ | 0.037f |
| $-R_4$ | 0.161f |
| $-R_5$ | 0.097f |
| $R_6$ | 0.263f |
| $-R_7$ | 0.203f |
| $R_8$ | ∞ |
| $R_9$ | ∞ |
| $R_{10}$ | 0.346f |
| $-R_{11}$ | 0.143f |
| $-R_{12}$ | 0.496f |
| $R_{13}$ | 0.170f |
| $-R_{14}$ | 0.161f |
| $-R_{15}$ | 2.397f |
| $-R_{16}$ | 0.260f |
| $R_{17}$ | 0.895f |
| $R_{18}$ | ∞ |
| $-R_{19}$ | 0.280f |
| $t_1$ | 0.003f |
| $t_2$ | 0.051f |
| $t_3$ | 0.035f |
| $t_4$ | 0.062f |
| $t_5$ | 0.013f |
| $t_6$ | 0.051f |
| $t_7$ | 0.019f |
| $t_8$ | 0.051f |
| $t_9$ | 0.013f |
| $t_{10}$ | 0.013f |
| $t_{11}$ | 0.035f |
| $S_1$ | 0.001f |
| $S_2$ | 0.001f |
| $S_3$ | 0.045f |
| $S_4$ | 0.011f |
| $S_5$ | 0.001f |
| $S_6$ | 0.010f |
| $S_7$ | 0.399f (nominal) |
| $n_{D1}$ | 1.720 |
| $n_{D2}$ | 1.517 |
| $n_{D3}$ | 1.517 |
| $n_{D4}$ | 1.523 |
| $n_{D5}$ | 1.522 |
| $n_{D6}$ | 1.517 |
| $n_{D7}$ | 1.751 |
| $n_{D8}$ | 1.517 |
| $n_{D9}$ | 1.720 |
| $n_{D10}$ | 1.720 |
| $n_{D11}$ | 1.541 |
| $\nu_1$ | 29.3 |
| $\nu_2$ | 64.5 |
| $\nu_3$ | 64.5 |
| $\nu_4$ | 58.6 |
| $\nu_5$ | 58.6 |
| $\nu_6$ | 64.5 |
| $\nu_7$ | 27.8 |
| $\nu_8$ | 64.5 |
| $\nu_9$ | 29.3 |
| $\nu_{10}$ | 29.3 |
| $\nu_{11}$ | 59.9 |

4. A microscope condenser lens comprising optical elements arrayed in order along an optical axis, said lens having an overall focal length $f$ and wherein:
the first element is a plano parallel plate I;
the second element is a plano-hemispheroidal lens II in surface contact with plate I and having a focal length $0.073f$;
the third element is a positive meniscus lens III, closely spaced from the lens II, concave toward the lens II and having a focal length $0.399f$;
the fourth element is a biconvex lens IV airspaced from lens III and having a focal length $0.299f$;
the fifth element is a plano parallel plate V airspaced from lens IV;
the sixth element is a biconvex lens VI airspaced from plate V and having a focal length $0.201f$;
the seventh element is a negative meniscus lens VII forming a doublet with lens VI and having a focal length $-0.274f$, the doublet having a focal length $0.725f$;
the eighth lens is a biconvex lens VIII airspaced from lens VII and having a focal length $0.165f$;
the ninth lens is a negative meniscus lens IX forming a doublet with lens VIII and having a focal length $-0.229f$, the doublet having a focal length $0.461f$;
the tenth lens is a biconcave lens X airspaced from said lens IX and having a focal length $-0.279f$; and
the eleventh lens is substantially plano convex with the plano side toward lens X and widely airspaced therefrom, and having a focal length $0.522f$.

5. A microscope condenser lens having a focal length $f$ and a plurality of optical elements arranged in order along an optical axis, said lens comprising:
a. a plano parallel plate;
b. a first biconvex doublet having a focal length of $0.725f$ airspaced from said plano parallel plate, said first doublet including a biconvex lens having a focal length of $0.201f$ and a negative meniscus lens having a focal length of $-0.274f$;
c. a second biconvex doublet having a focal length of $0.461f$ airspaced from said first doublet, said second doublet including a biconvex lens having a focal length of $0.165f$ and a negative meniscus lens having a focal length of $-0.229f$;
d. a biconcave lens airspaced from said second doublet and having a focal length of $-0.279f$; and
e. a plano convex lens having a focal length of $0.522f$ and airspaced between $0.330f$ and $0.370f$ from said biconcave lens.

6. A lens having a focal length $f$ and comprising a plurality of optical elements described by successive subnumbered radii R taken as positive when centered on one side of the lens and negative when centered on the other side and ratioed to $f$, by successive subnumbered thicknesses t and spatial separations S both ratioed to $f$, and by successive subnumbered glass characteristics, refractive indices $n_D$ and dispersions $\nu$, said plurality of optical elements comprising in consecutive sequence:
a substantially plano parallel plate V having radii $R_8$ and $R_9$ and thickness $t_5$;
a biconvex lens VI of radii $R_{10}$ and $-R_{11}$ and thickness $t_6$ airspaced from said plate V by a space $S_4$;
a negative meniscus lens VII of radii $-R_{11}$ and $-R_{12}$ and thickness $t_7$ in surface contact with said lens VI;
a biconvex lens VIII of radii $R_{13}$ and $-R_{14}$ and thickness $t_8$ airspaced from said lens VII by a space $S_5$;
a negative meniscus lens IX of radii $-R_{14}$ and $-R_{15}$ and thickness $t_9$ in surface contact with said lens VIII;
a biconcave lens X of radii $-R_{16}$ and $R_{17}$ and thickness $t_{10}$ airspaced from said lens IX by a space $S_6$; and
a lens XI widely airspaced by a space $S_7$ from said lens X, said lens XI being defined by a substantially plano radius $R_{18}$ facing said lens X, a radius $-R_{19}$, and a thickness $t_{11}$:
wherein:

| | | | | |
|---|---|---|---|---|
| 10f | < | $R_8$ | < | −10f |
| 10f | < | $R_9$ | < | −10f |
| 0.345f | < | $R_{10}$ | < | 0.381f |
| 0.134f | < | $-R_{11}$ | < | 0.144f |
| 0.431f | < | $-R_{12}$ | < | 0.497f |

| | | | | | | | |
|---|---|---|---|---|---|---|---|
| 0.169f | < | $-R_{13}$ | < | 0.179f | 0.330f | < | $S_7$ (focusable) | < | 0.370f |
| 0.143f | < | $-R_{14}$ | < | 0.162f | 1.520 | < | $n_{D5}$ | < | 1.524 |
| 1.211f | < | $-R_{15}$ | < | 2.398f | 1.515 | < | $n_{D6}$ | < | 1.519 |
| 0.257f | < | $-R_{16}$ | < | 0.261f | 1.749 | < | $n_{D7}$ | < | 1.753 |
| 0.815f | < | $R_{17}$ | < | 0.896f | 1.515 | < | $n_{D8}$ | < | 1.519 |
| 10f | < | $R_{18}$ | < | $-10f$ | 1.718 | < | $n_{D9}$ | < | 1.722 |
| 0.279f | < | $-R_{19}$ | < | 0.281f | 1.718 | < | $n_{D10}$ | < | 1.722 |
| 0.009f | < | $l_5$ | < | 0.16f | 1.539 | < | $n_{D11}$ | < | 1.543 |
| 0.051f | < | $l_6$ | < | 0.061f | 57.6 | < | $\nu_5$ | < | 59.6 |
| 0.019f | < | $l_7$ | < | 0.031f | 63.5 | < | $\nu_6$ | < | 65.5 |
| 0.051f | < | $l_8$ | < | 0.063f | 26.8 | < | $\nu_7$ | < | 28.8 |
| 0.011f | < | $l_9$ | < | 0.015f | 63.5 | < | $\nu_8$ | < | 65.5 |
| 0.013f | < | $l_{10}$ | < | 0.018f | 28.3 | < | $\nu_9$ | < | 30.3 |
| 0.032f | < | $l_{11}$ | < | 0.038f | 28.3 | < | $\nu_{10}$ | < | 30.3 |
| 0.010f | < | $S_4$ | < | 0.012f | 58.9 | < | $\nu_{11}$ | < | 60.9 |
| 0.001f | < | $S_5$ | < | 0.003f | | | | | |
| 0.009f | < | $S_6$ | < | 0.011f | | | | | |

\* \* \* \* \*